(12) United States Patent
Albrecht et al.

(10) Patent No.: US 7,320,951 B2
(45) Date of Patent: Jan. 22, 2008

(54) SILICA-BASED DRILLING MUD COMPRISING GLYCOSIDE LUBRICANTS WITH AMINO-LINKED ALKYL CHAINS

(75) Inventors: Michele Scott Albrecht, Houston, TX (US); Kenneth Michael Cowan, Sugar Land, TX (US); Robert Irving McNeil, III, Cypress, TX (US); Eric Van Oort, Houston, TX (US); Ronald Lee Rock, Sr., Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/257,824

(22) PCT Filed: Apr. 19, 2001

(86) PCT No.: PCT/EP01/04496

§ 371 (c)(1),
(2), (4) Date: Oct. 17, 2002

(87) PCT Pub. No.: WO01/81498

PCT Pub. Date: Nov. 1, 2001

(65) Prior Publication Data

US 2003/0092579 A1    May 15, 2003

(51) Int. Cl.
*C09K 8/20* (2006.01)
*C09K 8/08* (2006.01)
*E21B 43/16* (2006.01)

(52) U.S. Cl. .............. 507/111; 507/110; 507/212; 507/209; 166/305.1

(58) Field of Classification Search ............... 507/110, 507/141, 145, 136, 111, 128, 140, 209, 212, 507/276, 277
See application file for complete search history.

(56) References Cited

U.S. PATENT DOCUMENTS

| 3,761,410 A | | 9/1973 | Monshine et al. | |
| 3,979,303 A | | 9/1976 | Kang et al. | |
| 4,382,002 A | | 5/1983 | Walker et al. | |
| 5,403,820 A | * | 4/1995 | Walker ................. | 507/110 |
| 5,556,938 A | * | 9/1996 | Freeman et al. ........... | 528/328 |
| 5,602,082 A | * | 2/1997 | Hale et al. .................. | 507/115 |
| 6,123,159 A | * | 9/2000 | Brookey et al. ............ | 175/72 |
| 6,248,698 B1 | | 6/2001 | Mullen | |
| 6,716,799 B1 | * | 4/2004 | Mueller et al. ............. | 507/138 |

FOREIGN PATENT DOCUMENTS

| EP | 0 770 661 A1 | | 5/1997 |
| WO | WO 98/22551 | * | 5/1998 |
| WO | 00 43465 | | 7/2000 |

* cited by examiner

*Primary Examiner*—Randy Gulakowski
*Assistant Examiner*—Timothy J. Kugel

(57) ABSTRACT

The drilling mud with a lowered coefficient of friction having a silicate-based mud and a lubricant selected from the group consisting of: glycosides, alkylpolyalkoxyalcohols, alcohol ester polymers, amine phosphates, starch and combinations thereof.

8 Claims, No Drawings

SILICA-BASED DRILLING MUD COMPRISING GLYCOSIDE LUBRICANTS WITH AMINO-LINKED ALKYL CHAINS

FIELD OF THE INVENTION

This invention relates to a drilling mud with a lowered coefficient of friction, in particular a water-based drilling mud containing silicates. Such a drilling mud is referred to in the specification and the claims as silicate-based mud.

BACKGROUND OF THE INVENTION

During drilling, a drilling mud is used to help cool the drill bit and flush debris from the well bore. The drilling mud can cause additional friction between the mud and the bore hole wall and the mud and the metal components of the drilling operation, such as the casing, drill pipe and drill bit. This additional friction slows the drilling operation by reducing the drilling rate and the rate of penetration. The additional friction also reduces the variability of the drilling operation itself, in particular the degree of well bore deviation that may be drilled.

A silicate-based mud has a high coefficient of friction against rock or metal when compared to an oil-based or a synthetic-based mud, which is a drilling mud based on a synthetic hydrocarbon oil. However, the oil-based and synthetic-based mud presents certain environmental concerns and wells in certain locations may not be drilled using the lower friction mud. In addition, a synthetic-based mud is typically much more expensive than a silicate-based mud, making the mud based on a synthetic hydrocarbon oil economically less desirable. A silicate-based mud is preferred environmentally but exhibits a high coefficient of friction between the mud and the well bore and metal components. Typically a more traditional silicate-based mud has a lubricity measuring in the range of 0.3 or higher. It is desirable to lower the coefficients of friction in order to increase drilling rates and the rate of penetration. An additional advantage to a mud having a lower coefficient of friction is that it can be used in drilling a deviated well bore.

SUMMARY OF THE INVENTION

It is an object of the present invention to provide a silicate or water-based mud with a coefficient of friction at least comparable to an oil- or synthetic-based mud.

DETAILED DESCRIPTION OF THE INVENTION

To this end the drilling mud with a lowered coefficient of friction according to the present invention comprises a silicate-based mud and a lubricant selected from the group comprising glycosides, alkylpoly-alkoxyalcohols, alcohol ester polymers, amine phosphates, starch and combinations thereof.

The amount of lubricant is in the range of from about 1 to about 15% by mass (kg 5 lubricant per kg of the total mud).

The preferred additive is a glycoside, and more suitably a glucoside. Glucosides with any carbon number range may be used. By this is meant mono- or poly-saccharides with carbon number chains of any length, branched or unbranched. The chains may be attached to any position of any ring via oxygen, carboxyl or amino linkages. The glucoside may also have amino substituted, ester substituted or hydroxyl substituted alkyl chains. Examples are 4-hydroxybutyl-D-glucopyranoside, 4-aminobutyl-D-glucopyranoside, hexadecylphosphato-D-glucopyranoside, hexadecylphosphato-D-glucopyranoside and trimethylammoniumcarboxymethyl-D-glucopyranoside. An example of an alkylpolyalkoxyalcohol is triethylene-oxynonyl-D-glucopyranoside Examples of an alcohol ester polymer are 4-hydroxy propylcarboxy-D-glucopyranoside and stearyl-D-glucopyranoside. An examples of an amine phosphate is a lecithin structure with one carboxyl group replaced by D-glucopyranoside.

When a silicate mud is used, one preferred additive is a polysaceharide having 16 to 18 carbon chains. The amount of lubricant added is from about 1 to about 5% by mass, based upon the total of the mud. This makes for a mud to lubricant mass ratio of from about 1:0.01 to about 1:0.05.

A second preferred additive for a silicate mud is a polysaccharide having 1 to 7 carbon chains. About 3% to about 15% by mass of lubricant is added, for a mud to lubricant mass ratio of [between] from about 1:0.03 to about 1:0.15.

Another suitable lubricant is starch, and in particular corn syrup.

The silicate-base mud according to the invention may further include an anti-foaming agent and other components such as weighting material.

The invention is how described in ore detail by way of the below examples, wherein the lubricity of a silicate mud of composition according to Table 1 has been determined for various lubricants. The examples should not be construed to limit the scope of the invention.

TABLE 1

Composition of the silicate mud used in the examples (excluding the lubricants).

| Ingredient | Amount |
| --- | --- |
| Water | 0.72 barrel |
| Silicate D | 0.085 barrel |
| NaOH | 0.5 pounds per barrel |
| KCl | 12.6 pounds per barrel |
| NaCl | 63 pounds per barrel |
| Barazan D Plus | 1 pound per barrel |
| Pac-L | 0.5 pounds per barrel |
| N-Drill HT Plus | 4 pounds per barrel |
| Barite | 138 pounds per barrel |

Wherein Silicate D is a sodium silicate; Barazan D Plus is a synthetic biopolymer, used to control the viscosity and as a suspension agent; Pac-L is a filtration control agent; N-Drill HT Plus is a filtration control agent; and Barite is a weighting material. The amount of 0.085 barrel of Silicate D gives an equivalent of 12 pounds silicate per barrel water.

The coefficient of friction (the force parallel to the surface divided by the force normal to the surface, which forces act on a body moved by the force parallel to the surface) was determined using a lubricity tester manufactured by Alkco Services. The conditions were: normal force of 550 Newtons and force parallel to the surface of 2700 Newtons.

Hot rolling (HR) involved rolling the silicate mud for 16 hours at 150° F.

The results will be shown below. Table 2 shows the results with lubricants not according to the invention and Table 3 shows the results with lubricants according to the invention.

TABLE 2

Coefficients of friction with lubricants not according to the invention.

| Lubricant | Control, with no lubricant | on injection | after 20 minutes | HR |
|---|---|---|---|---|
| 3% w Petromaxx | 0.332 | 0.307 | 0.304 | ND |
| 3% w Deripohat 154-L | 0.282 | 0.264 | 0.262 | ND |
| 3% w Daxad 31 | 0.324 | 0.321 | 0.325 | 0.312 |
| 3% w Gem CP | 0.287 | 0.263 | 0.262 | ND |
| 5% w Gem CP | 0.287 | 0.272 | 0.281 | 0.295 |
| 3% w Jeffamine ED-600 | 0.311 | 0.256 | 0.262 | 0.273 |
| 3% w Ketjenlube 1300 | 0.301 | ND | 0.283 | 0.279 |
| 3% w Ketjenlube 135 | 0.333 | 0.207 | 0.201 | 0.233 |
| 3% w EMI-544 | 0.294 | 0.279 | 0.266 | 0.251 |
| 3% w Finagreen | 0.388 | 0.315 | 0.312 | ND |

Wherein Petromaxx is a polymerized poly butene oil family; Deripohat 154-L is a disodium N-tallow-beta-iminodipropionate; Daxad 31 is a sodium salt of maleic acid diisobutylene copolymer solution in water; Gem CP is a polayalkyleneglycol; Jeffamine ED-600 is and oxirane, methyl-, polymer with oxirane, bis(2-amino-propyl)ether; Ketjenlube 1300 is a butanol ester polymer; Ketjenlube 135 is a butanol ester polymer; EMI-544 is a commercial lubricant from MI; and Finagreen is an ester of natural fatty acids. The abbreviation ND is used to refer to not determined. Table 3. Coefficients of friction with lubricants net-according to the invention.

TABLE 3

Coefficients of friction with lubricants according to the invention

| Lubricant | Control, with no lubricant | on injection | after 20 minutes | HR |
|---|---|---|---|---|
| 3% w methyl glucoside | 0.336 | 0.273 | 0.282 | ND |
| 3% w methyl glucoside | 0.329 | 0.261 | ND | ND |
| 5% w methyl glucoside | 0.329 | 0.235 | ND | ND |
| 10% w methyl glucoside | 0.329 | 0.270 | 0.223 | 0.223 |
| 3% w Glucopon 625 | 0.308 | 0.226 | 0.214 | 0.205 |
| 1.5% w Glucopon 625 and 1.5% w Dehypon LS 36 | 0.326 | 0.240 | 0.194 | 0.205 |
| 1% w Daxad 31, 1% w Glucopon 625 and 1% w Dehypon LS-36 | 0.295 | 0.295 | 0.297 | ND |
| 10 ppb Emulgade 68/50 | 0.285 | 0.291 | 0.302 | 0.314 |
| 3% w Glucopon LF-1 | 0.359 | 0.207 | 0.215 | 0.195 |
| 10% w of a starch slurry | 0.293 | 0.222 | 0.217 | 0.216 |

Wherein Glucopon 625 is D-glucopyranoside, $C_{10-16}$-alkyl; Dehypon LS 36 is an ethoxylated, propoxylated lauryl alcohol; Emulgade 68/50 is a mixture of $C_{16-18}$-alkyl glucosides and fatty alcohol; Glucopon LF-1 is a mixture of alkyl polyglycosides and ethoxylated propoxylated aliphatic alcohol; and the starch is corn syrup.

A comparison between the results in the Tables shows the advantage obtained when using the lubricant according to the present invention.

The invention claimed is:

1. A drilling mud with a lowered coefficient of friction comprising a silicate-based mud and a lubricant selected from the group consisting of glycosides; wherein the lubricant is a glucoside selected from monosaccharides and olisaccharides having 2 to 4 saccharide groups; and wherein the glucoside comprises branched or unbranched alkyl chains of any length linked by amino linkages to any position of any ring.

2. The drilling mud according to claim 1, wherein the glucoside comprises branched or unbranched carboxyl chains of any length linked by amino linkages to any position of any ring.

3. The drilling mud according to claim 2, wherein the glucoside has amino substituted alkyl chains.

4. The drilling mud according to claim 2, wherein the glucoside has ester substituted alkyl chains.

5. The drilling mud according to claim 2, wherein the glucoside has hydroxyl substituted alkyl chains.

6. The drilling mud according to claim 1, wherein the concentration of the lubricant is from about 1% to about 5% by mass.

7. The drilling mud according to claim 1 wherein the concentration of the lubricant is from about 3% to about 15% by mass.

8. A drilling mud with a lowered coefficient of friction comprising a silicate-based mud and a lubricant selected from the group consisting of glycosides wherein the lubricant is a polysaccharide having alkyl chains having between 16 and 18 carbon atoms.

* * * * *